(12) United States Patent
Shondel (10) Patent No.: US 10,187,616 B2
(45) Date of Patent: Jan. 22, 2019

(54) UNMANNED AERIAL VEHICLE INVENTORY SYSTEM

(71) Applicant: James W. Shondel, Chicago, IL (US)

(72) Inventor: James W. Shondel, Chicago, IL (US)

(*) Notice: Subject to any disclaimer, the term of this patent is extended or adjusted under 35 U.S.C. 154(b) by 886 days.

(21) Appl. No.: 14/295,725

(22) Filed: Jun. 4, 2014

(65) Prior Publication Data
US 2014/0354809 A1 Dec. 4, 2014

Related U.S. Application Data

(60) Provisional application No. 61/830,740, filed on Jun. 4, 2013.

(51) Int. Cl.
*H04N 7/18* (2006.01)
*G06Q 10/08* (2012.01)
*G05D 1/10* (2006.01)

(52) U.S. Cl.
CPC ............ *H04N 7/185* (2013.01); *G05D 1/102* (2013.01); *G06Q 10/087* (2013.01)

(58) Field of Classification Search
CPC .............................................. B64C 2201/127
USPC ....................................................... 348/144
See application file for complete search history.

(56) References Cited

U.S. PATENT DOCUMENTS

2008/0077511 A1* 3/2008 Zimmerman .......... G06Q 10/00
                                                          705/28

OTHER PUBLICATIONS

Ong, JinHock. Mobile RFID system for inventory automation. Diss. Massachusetts Institute of Technology, 2008.*
Huck, Robert C., et al. "Aerial surveillance vehicles augment security at shipping ports." SPIE Europe Security and Defence. International Society for Optics and Photonics, 2008.*

* cited by examiner

Primary Examiner — Allen C Wong
(74) Attorney, Agent, or Firm — McAndrews, Held & Malloy, Ltd.

(57) ABSTRACT

Various embodiments provide a system and method for an unmanned aerial inventory system for maintaining an inventory record of shipping vessels at a storage facility. According to certain embodiments, the aerial inventory system includes an unmanned aerial vehicle having a detector and a transceiver. The detector is configured to detect an identifier of the shipping vessel. The transceiver is configured to transmit information relating to the identifier detected by the detector. The system may also include an operator device having a processor and a display. The operator device may be configured to receive information transmitted from the transceiver relating to the detected identifier and control the display of at least a portion of the information on the display. The operator device may further be configured to control at least a portion of a flight path of the unmanned aerial vehicle.

27 Claims, 5 Drawing Sheets

UNMANNED AERIAL VEHICLE INVENTORY SYSTEM

CROSS-REFERENCE TO RELATED APPLICATIONS/INCORPORATION BY REFERENCE

The present application claims priority under 35 U.S.C. § 119(e) to provisional application Ser. No. 61/830,740, filed on Jun. 4, 2013. The above referenced provisional application is hereby incorporated herein by reference in its entirety.

BACKGROUND OF THE INVENTION

Shipping vessels, such as, for example, storage containers and/or the trailers or chassis used to move the storage containers may be transported in a number of different manners before reaching a desired location or destination. For example, the shipment of a storage container via rail may be referred to as Container on Flat Car (COFC), while rail transport of a container that is on a trailer, such as an over the road trailer, may be referred to as Trailer on Flat Car (TOFC). Moreover, certain types of storage containers, such as, for example, intermodal containers, as well as the trailers used to haul the containers on road, may be transported via multiple modes of transportation, including rail, truck, and/or ship, without the unloading and reloading of the contents of the storage containers. Further, shipping equipment, such as storage containers and/or trailers (referred to herein collectively as "shipping vessels") may be transported by the same mode of transportation using different transportation vehicles, such as a shipping vessel traveling a portion of the way to its destination by being hauled or pulled by a truck, and be pulled or hauled another portion of the journey by another truck. Additionally, before, during, or after the shipping vessel reaches its desired location, the shipping vessel may be situated at least once at a storage facility with other shipping vessels, such as, for example, at a shipping port, railroad yard, and/or depot, among other storage locations.

Given the large number of shipping vessels that may be arriving, stored, and/or departing a storage facility, management of storage facilities may seek to maintain an accurate inventory of the shipping vessels at the storage facility. Often, at least some storage facilities maintain such inventory records by manual examination and/or identification of the shipping container(s) and their corresponding physical location at the facility. For example, an employee may travel by foot or in a vehicle around the storage facility and create or update an inventory record, such as, for example, recording an identification marker of the shipping container as well recording the location of the shipping container. In at least some instances, the employee may maintain, and update, an inventory record by manually writing on paper a shipping container identifier and the location of the shipping container. Other facilities may have the employee use a handheld or vehicle computer to record the identifier and location information, which may then be transmitted to a central inventory system.

However, the presence of employees traveling throughout the storage facility to gain information for inventory records may create a dangerous situation for the employees and a risk for the employer. More specifically, shipping vessels may continuously be entering, leaving, and otherwise moving around the storage facility. Further, given the size of at least some shipping vessels, the shipping vessels may be moved via a crane, such that shipping vessels may be moving above the heads of employees that are traveling around the storage facility. Additionally, in at least some instances, storage containers may be stacked on top of other storage containers to create relatively large piles of storage containers. A mishap, such as, for example, an equipment or machinery failure during the transport or storage of a shipping container at the storage location in the presence of an employee that is obtaining inventory information may have catastrophic consequences for the employee. Further, the presence of an employee taking such inventory information may create foot or vehicle traffic in the storage facility that may interfere with the efficient transport, storage and removal of shipping vessels in/from the storage facility.

BRIEF SUMMARY OF THE INVENTION

The present technology generally relates to an aerial inventory system for maintaining an inventory record of shipping vessels at a storage facility. According to certain embodiments, the aerial inventory system includes an unmanned aerial vehicle having a detector and a transceiver. The detector is configured to detect an identifier of the shipping container. The transceiver is configured to transmit information relating to the identifier detected by the detector. The system may also include an operator device having a processor and a display. The operator device may be configured to receive information transmitted from the transceiver relating to the detected identifier and control the display of at least a portion of the information on the display. The operator device may further be configured to control at least a portion of a flight path of the unmanned aerial vehicle.

Additionally, certain embodiments of the present technology provide a method for tracking an inventory of shipping vessels. The method may include flying an unmanned aerial vehicle about at least a portion of the shipping vessels. Additionally, an identifier of at least one shipping container may be detected by a detector of the unmanned aerial vehicle. The method may also include determining a location of the detected identifier and/or associated shipping container. Further, a signal relating to the detected identifier may be transmitted from the unmanned aerial vehicle. Additionally, the detected identifier and the location in an operator device may be recorded in an operation device.

DETAILED DESCRIPTION OF THE INVENTION

The present invention will now be described more fully with reference to the accompanying drawings, in which several embodiments are shown. This invention may, however, be embodied in many different forms and should not be construed as limited to the embodiments set forth here. Rather, these embodiments are examples of the invention, which has the full scope indicated by the language of the claims.

Figure 1:
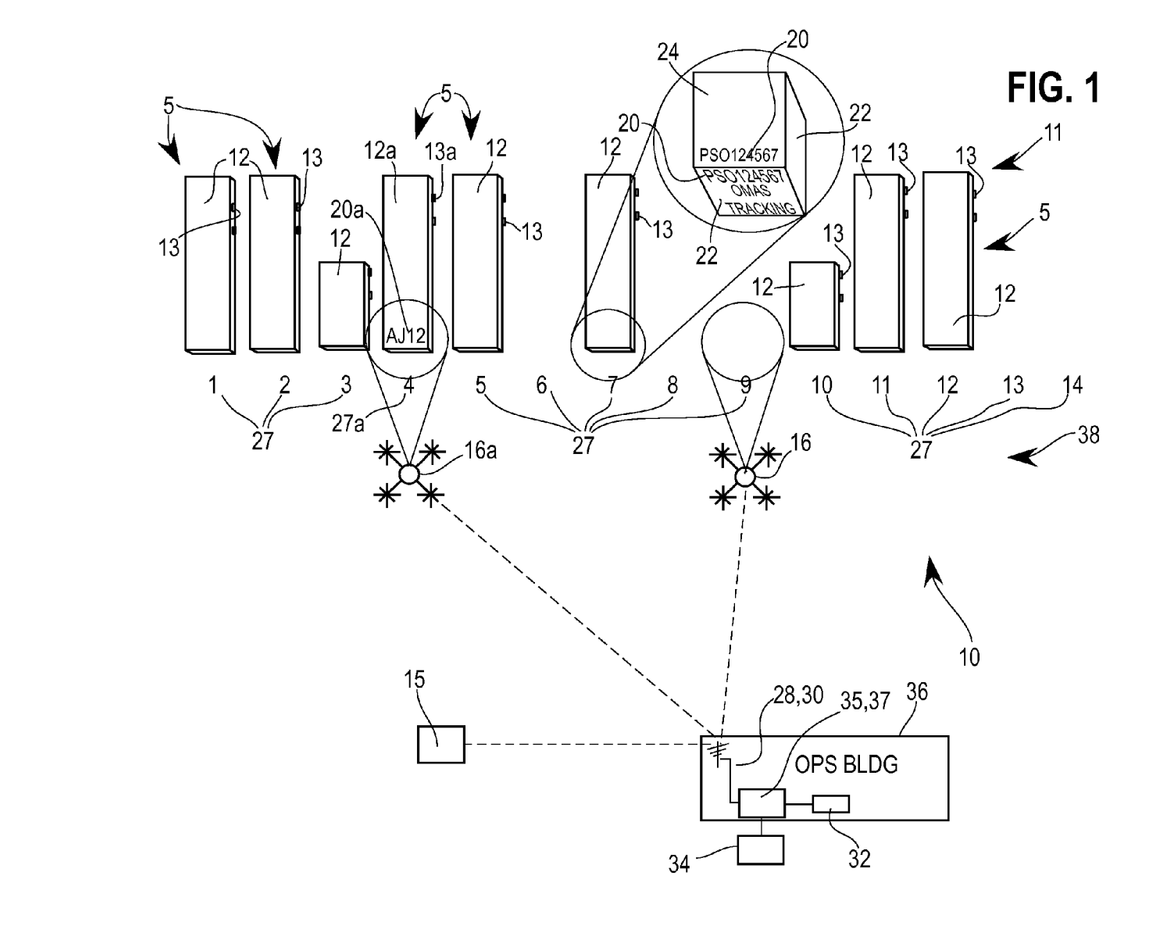
FIG. 1 illustrates a top view of the use of unmanned aerial vehicle inventory system according to an illustrated embodiment in which the storage containers are stored on semi-trailers or chassis.
Figure 2:
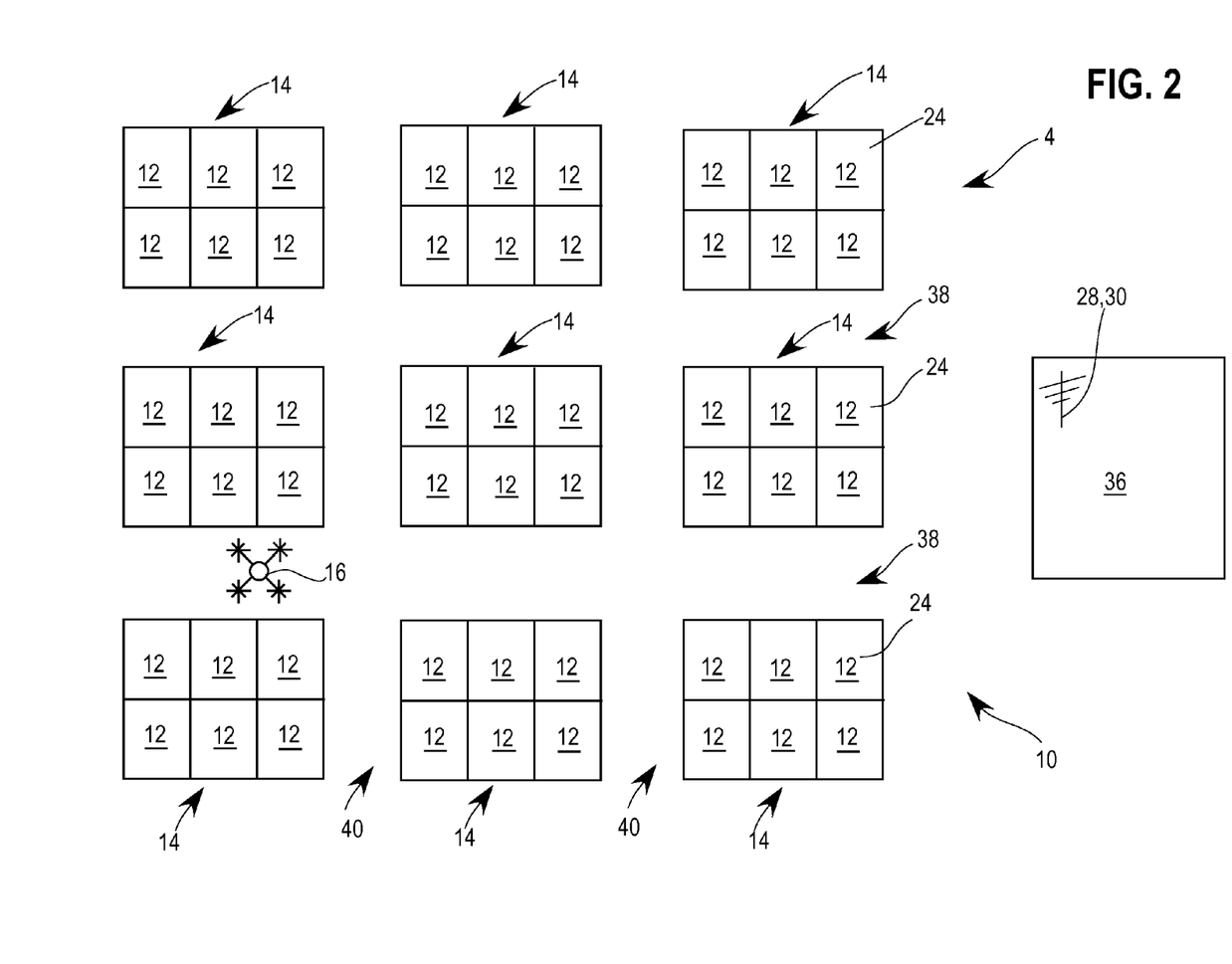
FIG. 2 illustrates a top view of the use of an unmanned aerial vehicle inventory system according to an illustrated embodiment in which the storage containers are arranged in one or more stacks of storage containers.
Figure 3:
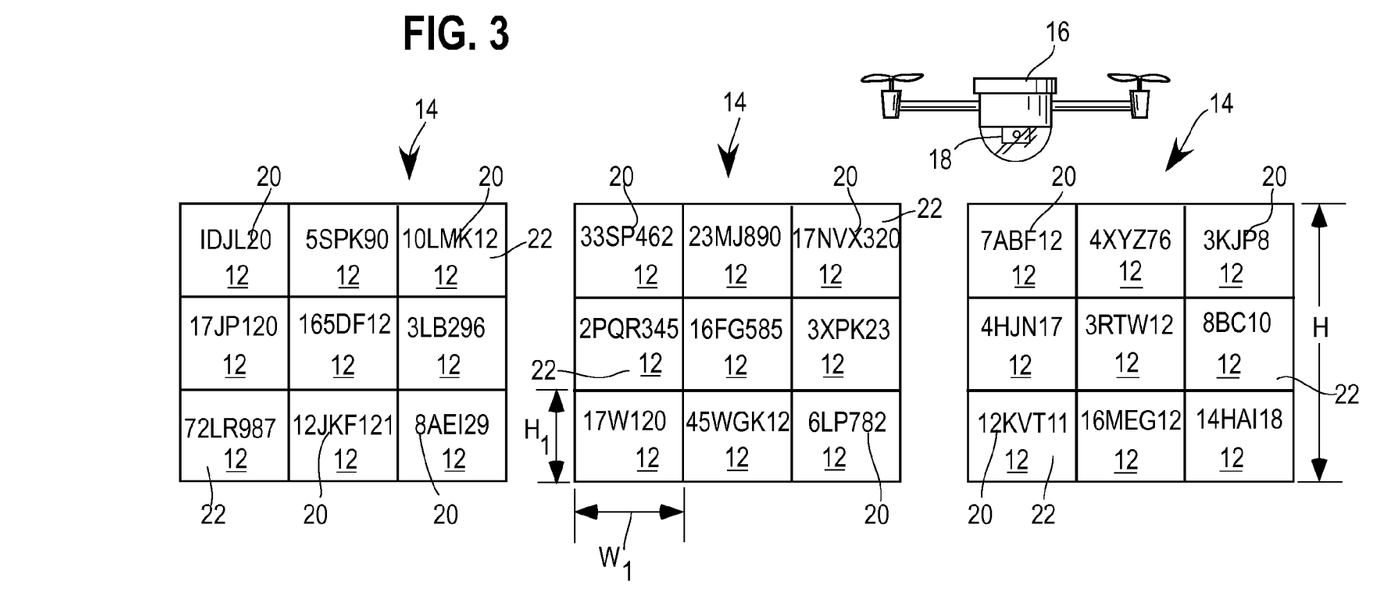
FIG. 3 is a side view of a portion of the plurality of stacks of storage containers illustrated in FIG. 2.

FIGS. 1 and 2 illustrate top views demonstrating the use of an unmanned aerial vehicle (UAV) inventory system 10 according to illustrated embodiments. More specifically, FIG. 1 provides an example in which the UAV inventory system 10 is used with shipping vessels 5 that include storage containers 12 that are stored on semi-trailers or chassis 13, while FIGS. 2 and 3 illustrate the UAV inventory system 10 being utilized with storage containers 12 that are arranged in one or more stacks 14 of storage containers 12. However, the UAV inventory system 10 may be utilized with storage containers 12 that are arranged in a variety of different configurations and/or combinations of different configurations, including storage containers 12 that are separated from, and/or stacked together with, other storage containers 12.

Further, according to certain embodiments, a UAV 16 may be used to identify shipping vessels 5 when the shipping vessels 5 arrive at the storage location, and/or before the shipping vessels 5 are unloaded for storage at the storage location. For example, as previously discussed, shipping vessels 5 may arrive at the storage location through use of a variety of different transportation vehicles, including via train, boat, or truck. In such situations, the UAV 16 may be used to maneuver around the shipping vessels 5 to detect an associate identifier while the shipping vessels 5 are still on a boat or train or operably connected to a truck. According to certain embodiments, such initial identification and/or inventory of the shipping vessels 5 may be similar to a Train Standing Order (TSO) that may occur when shipping 5 arrive via train. Moreover, such initial inventory through the use of the UAV 16 may allow an opportunity for prioritizing shipping vessels 5 and, more specifically, setting an order in which the shipping vessels 5 will be unloaded. Such prioritizing may consider a variety of different factors, such as, for example, the contents being shipped via the shipping vessel 5, the weight of the shipping vessel 5 and its contents, the number of shipping vessels to be unloaded, and/or the physical dimensions of the shipping vessels 5.

Similar to an initial inventory before shipping vessels 5 have been unloaded in the storage location, the UAV 16 may also be deployed in connection with performing a departure inventory. The UAV 16 may be utilized in creating a departure inventory after or during the loading of shipping vessels 5 from the storage location and onto a transportation vehicle, such as a train, boat, or other vehicle. Such a departure inventory may be performed at least in connection with evaluating whether a loading plan, such as a train plan, has been satisfied and the shipping vessels 5 that are to be departing are loaded onto the train, boat, or other vehicle.

According to certain embodiments, the UAV inventory system 10 may include one or more UAVs 16, such as, for example, a drone, a remotely piloted vehicle, a remotely piloted aircraft, and/or a remotely operated aircraft, among other vehicles or devices configured for aerial displacement or flight. Moreover, the UAV 16 may be an unmanned aircraft that is controlled autonomously by a computer in the UAV 16, or through the use of a remote control. A variety of different UAVs 16 may be employed, including, for example, a copter or multicopter that is lifted and/or propelled by one or more rotors. Further, according to certain embodiments, the flight path, including location and altitude, of the UAV 16 may be controlled by a variety of different source, including, for example, via a remotely located joystick(s) or touch screen monitor, programming of the UAV 16, programming or instructions that are wirelessly communicated to the UAV 16, and/or sensors that are operably connected to the UAV 16.

According to certain embodiments, the shipping vessels 5, such as the storage containers 12 or trailers 13, used with the UAV inventory system 10 may include one or more identifiers 20. A variety of different identifiers 20 may be employed. For example, according to certain embodiments, the identifier 20 may at least include optically detectable indicia, such as, for example, a collection of one or more letters, numbers, symbols, license plate number, and/or barcode, among others characters or indicia. Further, according to certain embodiments, the identifier 20 may at least be part of a standardized code, such as, for example, a code issued by the Bureau International des Containers et du Transport Intermodal (BIC), an Intermodal Loading Unit (ILU) code, and/or a code assigned by the UAV inventory system 10, among other codes. Further, the identifier 20 may be a code on the storage container 12 or trailer 13 that provides manufacturer, ownership, usage classification, hazardous goods, and/or other reference codes, among other types of information. Additionally, the identifier 20 may be positioned at a variety of different locations on the storage container 12 or trailer 13, including, for example, on one or more sidewalls 22 and/or an upper wall 24 of the storage container 12 and/or trailer 13, as shown, at least in FIG. 1. According to certain embodiments, or in addition to, or in lieu of, an optically detectable identifier 20, the identifier 20 may be provided via a wireless signal or communication, such as, for example, the identifier 20 being provided through a radio frequency identification device.

The UAV 16 may include a detector 18 that is used to detect the identifier 20. For example, according to certain embodiments, the detector 18 may be a camera or recording device that may capture or record an image(s), such as photographic, video, and/or digital images. However, a variety of other detectors 18 may be employed, including, for example, a detector 18 that detects bar codes or otherwise receives information, such as, for example, detects a radio frequency signal and/or information contained therein.

Figure 4:
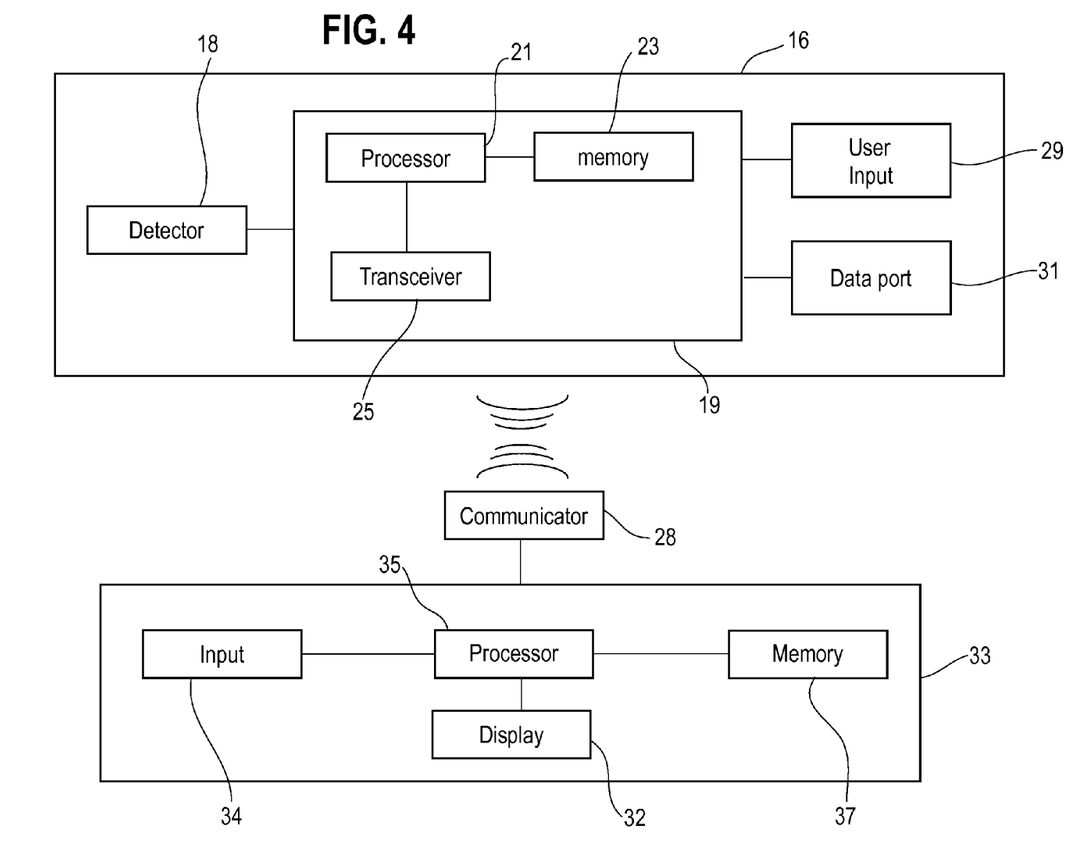
FIG. 4 illustrates a block diagram of a controller of a UAV and an operator controller according to certain embodiments of the present invention.

According to certain embodiments, the detector 18 may be operably connected to a controller 19, which may include a processor 21, a memory 23, and a transceiver 25, as shown in FIG. 4. The memory 23 may or may not be part of the processor 21. The memory 23 may store programming, instructions, or other information that is used or executed by the processor 21. Suitable memories 23 include, but are not limited to, permanent memory, RAM, ROM, or a hard drive, among others. The controller 19 may be used to operate the detector 18 as well as the UAV 16.

The controller 19 may also be configured to utilize applications that may or may not be stored in the memory 23, including, for example, applications relating to global positioning systems (GPS), among others. Such GPS capabilities may be utilized, according to certain embodiments, to provide information relating to the positioning of the storage container 12 and/or trailer 13 at the storage facility 11, or the absence of a storage container 12 and/or trailer 13 at a particular location at the facility 11. Further, according to certain embodiments, the processor 21 may be used with an optical character recognition (OCR) program to not only recognize identifiers 20 that are optically detected by the detector 18, but also positional markers 27, such as, for example, the positional markers 27 shown in FIG. 1, which may indicate a particular storage location. Such markers 27 may be positioned on the shipping containers, such as on the storage containers 12 and/or trailers 13 and/or at a location adjacent to the storage container 12 and/or trailer 13, such as, for example, positioned or applied on a surface beneath or adjacent to the storage container 12 and/or trailer 13, or posted on a wall, sign, or post near, above, or underneath the storage container 12 and/or trailer 13.

The controller 19 may also be operably connected to a user input 29, such as, for example, a keypad or touch screen device, that is used to input information directly into the controller 19. The controller 19 may also be operably connected to a data port 31, which may also allow for the uploading and/or downloading of data to/from the controller 19, such as, for example, via a wired connection or an external memory device.

According to certain embodiments, the UAV 16 may be in communication with an operator device 26, such as, for example, a server, computer, tablet computer, portable communication device, or handheld electronic device, among others. Further, the operator device 26 may be configured to manage and store information transmitted from the UAV 16, or has retrievable access to such transmitted information. According to certain embodiments, the operator device 26 may be stored in an operations building 36 that is positioned at, or remotely from, the storage facility 11 where the storage containers 12 and/or trailers 13 are located. However, alternatively, the operator device 26 may also be a portable device.

According to certain embodiments, the operator device 26 may include an operator controller 33, which may include a processor 35 and a memory 37. The memory 37 may or may not be part of the processor 35. Further, the memory 37 may store programming, instructions, or other information that is used or executed by the processor 35. Suitable memories 37 include, but are not limited to, permanent memory, RAM, ROM, or a hard drive, among others. The operator controller 33 may be operably connected to a communicator 28, which, according to certain embodiments, may be a transceiver. Further, according to certain embodiments, the communicator 28 may include at least a communication tower or antenna 30. The communicator 28 may be configured to allow for communication to and/or from the controller 19 of the UAV 16 and the operator controller 33, such as, for example, two-way wireless communication, such as, for example, communication utilizing Wi-Fi, radio frequency, microwave, satellite, and/or cellular technologies.

Additionally, the operator device 26 may also communicate to secondary devices 15, such as, for example, through two-way wireless communications. Such secondary devices 15 may allow staff and/or third parties access to information stored or retrievable by the operator device 26 relating to the storage containers 12 and/or trailers 13 stored at the storage facility 11, as well as their location at the storage facility 11. Secondary devices 15 may include a variety of electronic devices that may include user interfaces, including, for example, servers, computers, tablet computers, portable processor based electronic devices, and hand-held communication devices, among others.

For example, end users of the UAV inventory system 10 may be able to remotely verify information stored or accessible to the operator device 16 that had been transmitted from the UAV 16. Such use of secondary devices 15 to access real-time and/or historical information that is/has been transmitted from the UAV 16 may allow the user(s) to verify, update, modify, or correct inventory information that is being maintained or compiled by the UAV inventory system 10. Security measures however may be in place to control which information is accessible or modifiable to the end user(s), and which end user(s) may be granted access to such information.

The operator device 26 may also include a display or monitor 32 that is configured to display information, including images, to a user. The operator device 26 may also include, or be operably in communication with, an input 34, such as, for example a keypad or mouse. The operator device 26 may also include, or be operably connected to, controls used to operate the UAV 16. Thus, according to certain embodiments, the input 34 may include a joystick or other user operated control that is used to control the operation of the UAV 16. Further, according to certain embodiments, the display 32 may include or have a touch screen that provides an input 34 for controlling the operation of the operator device 26 and/or the UAV 16.

Figure 5:
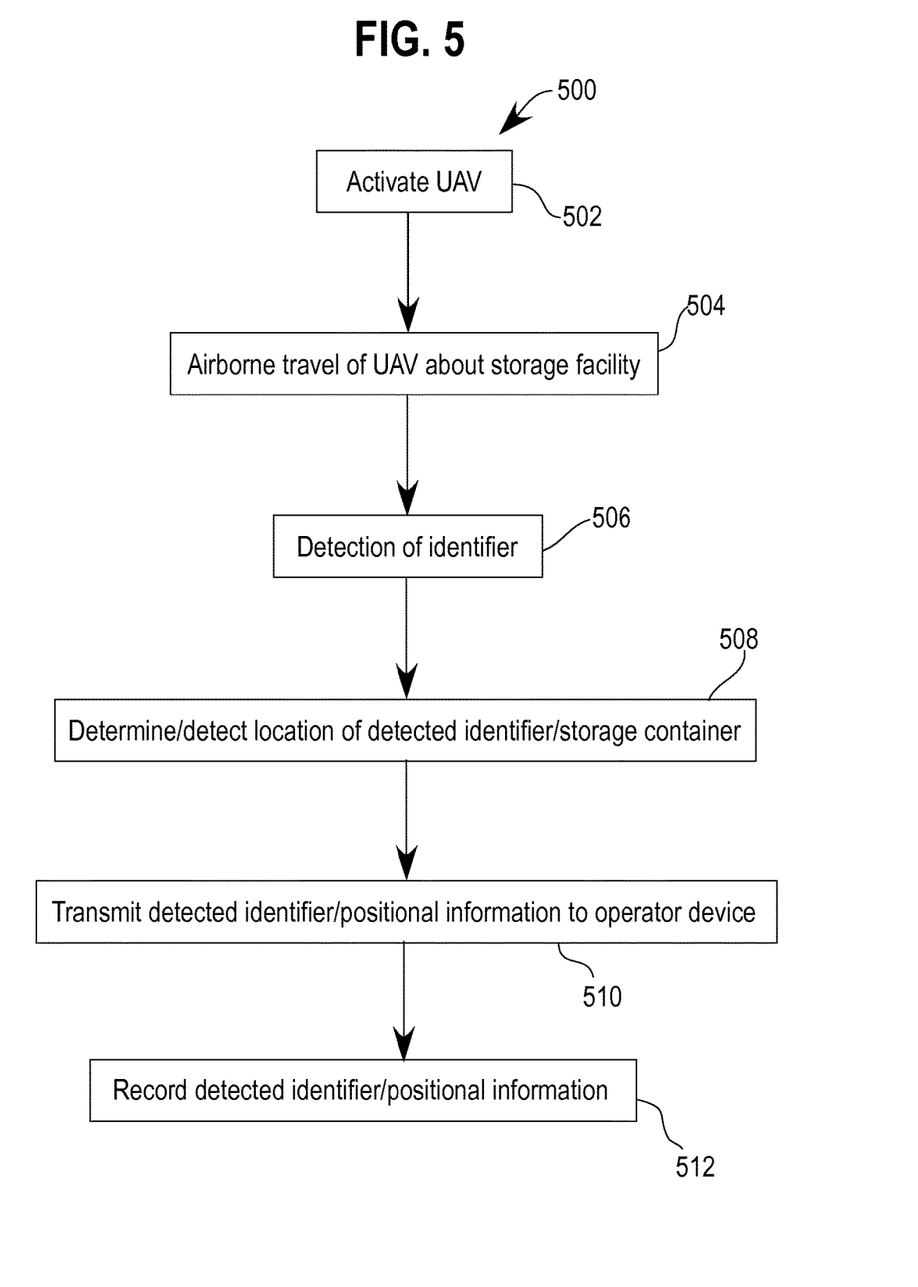
FIG. 5 illustrates a flow chart of a method for the operation of a UAV inventory system according to an illustrated embodiment of the present invention.

FIG. 5 provides a flow chart of a method 500 for the operation of a UAV inventory system 10 according to certain embodiments of the present invention. At step 502, the UAV 16 may be activated so that the UAV 16 may engage in aerial travel along at least a portion of the storage facility 11 that contain shipping vessels 5 and/or the vessel or vehicle that are loaded with shipping vessels 5. Such activation may include, at least initially, instructions being provided to the UAV 16 from the operator controller 33, such as, information pertaining to the operation and flight of the UAV 16, among other instructions. For example, a communication with instructions or commands regarding the flight of the UAV 16 may be communicated from the operator device 26 through the communicator 28 to the UAV 16.

The instructions provided from the operator controller 33 may indicate the direction, speed, and altitude that the UAV 16 is to travel. As previously mentioned, the direction of travel of the UAV 16 may be controlled in a number of manners, including for example, via programming of the controller 19 of the UAV 16, or the programming or operation of the operator controller 33, such as, for example, operation of a joystick, touch screen monitor, keypad, or mouse, among others. The instructions provided by the operator controller 33 and/or programmed in the controller 19 of the UAV 16 may also provide a flight plan for the UAV 16. For example, the instructions may provide an indication of where the UAV 16 is, and is not, to travel. For example, such instructions may include an indication of the particular rows 38 and aisles 40 between storage containers 12 and/or trailers 13 or stacks 14 of storage containers 12 that the UAV 16 is to generally travel about, and the order of such travel about such rows 38 and aisles 40. The actual flight path taken by the UAV 16 may depend on a variety of different factors, including, for example, the location of the identifier 20 on the storage containers 12 and/or trailer 13, and/or the traffic or working occurring at the storage facility 11.

The altitude at which the UAV 16 travels, and whether that altitude is varied during use of the UAV 16, may be also determined by a variety of different factors. For example, the altitude may vary depending on the height of the storage container 12 and/or trailer 13, and/or the overall height of a stack 14 of storage containers 12, as indicated by "H" in FIG. 3. Moreover, the altitude at which the UAV 16 travels may be at least partially dependent on the location of the identifier 20 on the storage containers 12 and/or trailer 13, as well as, the ability of the detector 18 to accurately detect the identifiers 20. The altitude at which the UAV 16 travels may also be at least partially dependent on the equipment being used in the storage facility 11, such as an overhead crane, so as to at least attempt to prevent the UAV 16 from coming into potentially harmful contact with such equipment.

At step 504, as the UAV 16 travels along the storage facility 11, the detector 18 may detect an identifier 20 of a storage container 12 and/or trailer 13 at a particular location. Additionally, at step 504, the failure to detect by the detector 18 an identifier 20 may indicate the absence of a storage container 12 and/or trailer 13 at the associated location.

At step 506, the location of the detected identifier 20, and/or the position of the associated storage container 12 and/or trailer 13, at the storage facility 11 may be detected. For example, according to certain embodiments, the detector 18 may detect a position marker 27 that is associated with the location at which the identifier 20 was detected, such as recording an image that displays the position marker 27. The position marker 27 associated with the detected identifier 20 may then be identified by a user or evaluated by an application, such as an application having OCR capabilities that may be run on the controller 19 or the operator controller 33. Additionally, according to certain embodiments, the UAV inventory system 10 may identify the location of a detected identifier 20/storage container 12 and/or trailer 13 based at least in part on the location of the UAV 16 when detection of the identifier 20 occurred, such as through the use of a global positioning system (GPS), positional/map coordinates, the altitude of the UAV 16 when the detector 18 detected the identifier 20, and/or the altitude or height at which the identifier 20 is located on the storage container 12 and/or trailer 13 or the stack 14 of storage containers 12.

For example, referencing FIG. 1, a UAV 16a at a first location may detect an identifier 20a associated with a first storage container 12a and/or trailer 13a. Additionally, the UAV 16a may also detect a position marker 27a associated with the location of the detected identifier 20a. In this example, a position marker 27a indicates that the detected identifier 20a ("AJ12"), and associated storage container 12a, is located at storage location "4." The UAV 16 may also be used to indicate locations at the storage facility 11 that are not presently occupied by a storage container 12 and/or trailer 13, such as, for example, locations indicated by position markers "6," "9," "13," and "14" in FIG. 1. According to certain embodiments, the absence of a storage container 12 and/or trailer 13 at a particular location may be determined in a variety of different manners, such as, for example, by visual conformation from images obtained by the detector 18, sensors, such as the use of lasers, among others, and/or by the absence of a detected identifier 20 at a particular location at the storage facility 11.

At step 508, information regarding the detected identifier 20 and/or information pertaining to the location of the detected or undetected identifier 20 may be transmitted from the UAV 16 for delivery to the operator controller 33. As previously discussed, the information transmitted from the controller 19 may take a variety of different forms. For example, video or photographic images may be transmitted from the UAV 16 and used by the operator controller 33 and/or an end user to identify the identifier 20 and/or location of the storage container 12 and/or trailer 13. Alternatively, the UAV 16, and more specifically the controller 19, may determine or receive the identifier 20 and/or positional information of the identifier 20/storage container 12 and/or trailer 13 before transmitting that information to the operator controller 33. For example, the controller 19 may employ a program, such as a program having OCR capabilities, to determine an identifier 20 and position marker 27 from an image(s) captured or otherwise recorded through the use of the detector 20. In such embodiments, the determined identifier 20 and/or position marker 27 may be transmitted from UAV 16 to the operator controller 33. Further, according to certain embodiments, information detected by the detector 18 may be continuously transmitted for receipt by the operator controller 33, may be transmitted at certain intervals, transmitted for a period of time after an identifier 20 has been detected, and/or transmitted or downloaded after the UAV has completed a flight path about the facility 11.

According to certain embodiments, the information transmitted by the UAV 16 may include information beyond the identification and location of containers 12 and/or trailers 13 at the facility 11. For example, UAV 16 may also be adapted to sense and/or transmit information relating to the temperature, wind speed and direction, and humidity of the ambient environment. Additionally, the UAV 16 may be adapted to transmit to the operator controller 33 information pertaining to the operation of the UAV 16, such as fuel/battery levels, flight control status, and travel speed, direction, and altitude, among other information.

At step 510, the identifier 20 and/or the location information may be recorded, such as by the operator controller 33, and/or displayed on the display 32, so as to provide an inventory of the containers 12 and/or trailers 13 stored at the facility 11 and the location of those containers 12 and/or trailers 13. For example, the operator controller 33 may display the image/recording that was detected by the detector 18 on the display 32, wherein a user may record the detected identifier 20, such as, for example, in the operator device 26, on paper, or on a separate electronic device or storage medium. Alternatively, the operator controller 33 may determine the identifier 20 and/or position marker 27 from the information obtained by the detector 18 and record the information, such as, for example, in the memory 37. Additionally, the operator device 26, or a storage medium operably connected to the operator device, such as, for example, a permanent memory, RAM, ROM, or a hard drive, among others, may store the information detected by and/or transmitted from the UAV 16, including information detected by the detector 18.

According to certain embodiments, the inventory provided by the method 500 may be updated on a regular, semi-regular, or irregular basis through subsequent uses of the UAV 16. Additionally, the inventory may also be updated via use of the input 34 of the operator device 26, or other communications provided to the operator device 26, such as, for example, via wireless communications from a hand held portable communications device, such as a smart phone or tablet, among others.

The present invention may also be embedded in a computer program product, which comprises features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus configured for carrying out the methods described herein is suited.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims

The invention claimed is:

1. An aerial inventory system for maintaining an inventory record of shipping vessels at a storage facility, the aerial inventory system comprising:
   an unmanned aerial vehicle having a detector and a transceiver, the detector configured to detect an identifier of the shipping vessel, the transceiver configured to transmit information relating to the identifier detected by the detector; and
   an operator device having a processor and a display, the operator device being configured to receive information transmitted from the transceiver relating to the detected identifier and control display of at least a portion of the information on the display, the operator device being configured to control at least a portion of a flight path of the unmanned aerial vehicle, and the operator device being configured to determine a location of the identifier detected by the detector, wherein the location is determined at least in part on an altitude of the unmanned aerial vehicle.

2. The aerial inventory system of claim 1, wherein the transceiver is configured to transmit an image of the identifier to the operator device.

3. The aerial inventory system of claim 2, wherein the display is configured to display the image provided with the transmitted information.

4. The aerial inventory system of claim 1, wherein the detector is configured to detect a position marker, the position marker configured to provide information related to the location of the detected identifier.

5. The aerial inventory system of claim 1, wherein the location is determined through the use of a global positioning system.

6. The aerial inventory system of claim 1, wherein the location is determined based on a map coordinate location of the unmanned aerial device.

7. The aerial inventory system of claim 1, wherein the information transmitted from the transceiver includes a location of a position marker.

8. The aerial inventory system of claim 1, wherein the operator device includes an operator controller, the operator controller being configured to utilize an optical character recognition application to identify the identifier provided in the information transmitted.

9. The aerial inventory system of claim 8, wherein the operator controller is configured to utilize an optical character recognition application to identify, using the transmitted information, the location of the detected identifier.

10. The aerial inventory system of claim 1, wherein the unmanned aerial vehicle includes a controller, the controller being configured to utilize an optical character recognition application to identify the identifier provided in the information transmitted.

11. The aerial inventory system of claim 10, wherein the controller is configured to utilize an optical character recognition application to identify the location of a position marker.

12. The aerial inventory system of claim 1, wherein information transmitted by the transceiver is received by a communicator, the communicator being operably connected to the processor of the operator device.

13. The aerial inventory system of claim 1, comprising a secondary device configured to communicate with the operator device, the secondary device at least one of being positioned at a location remote from the storage facility and being a portable device.

14. The aerial inventory system of claim 1, wherein the operator device is configured to control at least one of the following of the flight path of the unmanned aerial vehicle: a direction of travel, the altitude, and a velocity.

15. A method for tracking an inventory of shipping vessels comprising:
   flying an unmanned aerial vehicle about at least a portion of the shipping vessels;
   detecting by a detector of the unmanned aerial vehicle an identifier for at least one shipping vessel;
   determining a location of the detected identifier based at least in part on a determination of an altitude of the unmanned aerial vehicle;
   transmitting a signal relating to the detected identifier from the unmanned aerial vehicle; and
   recording the detected identifier and the location in an operator device.

16. The method of claim 15, wherein flying the unmanned aerial vehicle includes transmitting flight path information to the unmanned aerial vehicle.

17. The method of claim 16, wherein the transmitted flight path information includes at least one of the following operating parameters for the unmanned aerial vehicle: a direction of travel, an altitude, and a velocity.

18. The method of claim 15, wherein transmitting a signal includes transmitting an image of the identifier.

19. The method of claim 15, comprising displaying an image relating to the transmitted signal on a display.

20. The method of claim 15, wherein determining the location of the detected identifier includes detecting a position marker.

21. The method of claim 15, wherein determining the location of the detected identifier includes determining a location of the detected identifier by a global positioning system.

22. The method of claim 15, wherein determining the location of the detected identifier includes determining a map coordinate location of the unmanned aerial device.

23. The method of claim 15, comprising identifying the detected identifier.

24. The method of claim 23, wherein identifying the detected identifier includes utilizing an optical character recognition application to identify the detected identifier.

25. The method of claim 15, wherein determining the location of the detected identifier includes utilizing an optical character recognition application to identify a position marker.

26. The method of claim 15, comprising transmitting a signal identifying the detected identifier to a secondary device, the secondary device at least one of being positioned at a location remote from the storage facility and being a portable device.

27. The method of claim 15, wherein the unmanned aerial vehicle is flown around at least one storage vessel that is located on a transportation vehicle and an identifier associated with the at least one storage vessel is detected before the at least one storage vessel has been unloaded from the transportation vehicle or before the transportation vehicle departs from the storage facility.

* * * * *